(12) United States Patent
Johnson

(10) Patent No.: US 12,030,434 B2
(45) Date of Patent: Jul. 9, 2024

(54) MIRROR EXTENSION ARM FOR A WIDE-LOAD TRUCK

(71) Applicant: Travis L. Johnson, Spokane Valley, WA (US)

(72) Inventor: Travis L. Johnson, Spokane Valley, WA (US)

(*) Notice: Subject to any disclaimer, the term of this patent is extended or adjusted under 35 U.S.C. 154(b) by 306 days.

(21) Appl. No.: 17/700,432

(22) Filed: Mar. 21, 2022

(65) Prior Publication Data
US 2022/0297602 A1  Sep. 22, 2022

Related U.S. Application Data

(60) Provisional application No. 63/163,251, filed on Mar. 19, 2021.

(51) Int. Cl.
  *B60R 1/06* (2006.01)

(52) U.S. Cl.
  CPC .......... *B60R 1/0617* (2013.01); *B60R 1/0605* (2013.01)

(58) Field of Classification Search
CPC ..... B60R 1/0605; B60R 1/0617; B60R 1/078; B60R 1/082
USPC .......................................... 359/841
See application file for complete search history.

(56) References Cited

U.S. PATENT DOCUMENTS

| | | | | |
|---|---|---|---|---|
| 2,241,866 A | * | 5/1941 | Needham | B60R 1/078 359/881 |
| 2,827,255 A | * | 3/1958 | Kampa | B60R 1/078 248/480 |
| 3,166,197 A | * | 1/1965 | Caylor | B60R 1/078 359/881 |
| 4,123,030 A | * | 10/1978 | Johansson | B60R 1/078 248/478 |
| 4,558,930 A | * | 12/1985 | Deedreek | G02B 7/1827 359/881 |
| 5,342,015 A | * | 8/1994 | Burton | B60R 1/078 248/478 |
| 5,513,048 A | | 4/1996 | Chen | |
| 5,997,147 A | * | 12/1999 | Tatoian | G02B 7/1824 359/857 |

(Continued)

OTHER PUBLICATIONS

New product for your fender safety mirror (11/8" tubing), Retrieved from Internet, Retrieved on Mar. 17, 2022 <URL: http://www.sureplus.com/whatsnew.htm>.

(Continued)

*Primary Examiner* — Ricky D Shafer

(57) ABSTRACT

A mirror extension arm for a wide-load truck is an apparatus that allows a driver of the wide-load truck to have a wider peripheral vision range and eliminates blind spots. The apparatus includes an extension tube, a slide bar, a mounting spindle, at least one locking clamp, and a fastening mechanism. The extension bar and the slide bar offset a secondary side mirror from a corresponding side of the wide-load truck. The secondary side mirror is preferably positioned beside an existing side mirror. The extension bar connects with a bracket of the existing side mirror, and the slide bar varies the distance of the secondary side mirror and existing side mirror. The mounting spindle upholds the secondary side mirror. The at least one locking clamp attaches the extension bar with the bracket of the existing side mirror. The fastening mechanism locks the slide bar along the extension tube.

20 Claims, 7 Drawing Sheets

(56) References Cited

U.S. PATENT DOCUMENTS

| | | | |
|---|---|---|---|
| 6,582,087 B2 | 6/2003 | Whitehead et al. | |
| 7,455,414 B2 | 11/2008 | Duroux et al. | |
| 9,205,779 B1 * | 12/2015 | Liu | B60R 1/078 |
| 9,969,333 B2 * | 5/2018 | Ervin | B60R 1/07 |
| 9,969,334 B2 | 5/2018 | De Wind et al. | |
| 11,679,718 B2 * | 6/2023 | Milbank | B60R 1/078 |
| | | | 359/871 |
| 11,789,231 B2 * | 10/2023 | Nolf | B60R 1/074 |
| | | | 359/841 |
| 2014/0131159 A1 * | 5/2014 | Lang | F16D 7/00 |
| | | | 192/56.41 |
| 2015/0183374 A1 * | 7/2015 | Liu | B60R 1/078 |
| | | | 359/865 |

OTHER PUBLICATIONS

Peterbilt 567 579 mirror extension brackets Oversize Heavy Haul Wide Load, Retrieved from Internet, Retrieved on Mar. 17, 2022 <URL: https://www.ebay.com/itm/274805932545>.

Kenworth T880 Oversize Load Mirror Extension Bracket, Retrieved from Internet, Retrieved on Mar. 17, 2022 <URL: https://www.mirrorextension.com/product-page/kenworth-t880-oversize-load-mirror-extension-bracket>.

Kenworth t680 t880 w990 mirror extension brackets oversize heavy haul lowbed, Retrieved from Internet, Retrieved on Mar. 17, 2022 <URL: https://www.ebay.com/itm/274805937983>.

* cited by examiner

MIRROR EXTENSION ARM FOR A WIDE-LOAD TRUCK

The current application claims a priority to the U.S. Provisional Patent application Ser. No. 63/163,251 filed on Mar. 19, 2021. The current application is filed on Mar. 21, 2022 while Mar. 19, 2022 was on a weekend.

FIELD OF THE INVENTION

The present invention generally relates to wide-load truck safety accessories. More specifically, the present invention is a mirror extension arm for a wide-load truck.

BACKGROUND OF THE INVENTION

Mirror extensions are additional mirrors mounted on the side mirror assembly that is placed on the exterior of motor vehicles for the purpose of helping the driver to see wider areas behind and to the sides of the vehicle. Further, the mirror extensions allow the driver to see wider peripheral visions including blind spots.

An objective of the present invention is to provide a mirror extension that can be mounted to an existing side mirror assembly of wide-load trucks. The present invention does not require additional tools for making adjustments such as distance between an existing side mirror and a secondary side mirror or the angle of the secondary side mirror. Moreover, the present invention can achieve a 360-degree rotation of mirrors for unlimited adjustments. The present invention ensures the safety of not only the driver of the wide-load truck, but oncoming traffic as well.

DETAILED DESCRIPTIONS OF THE INVENTION

Figure 1:
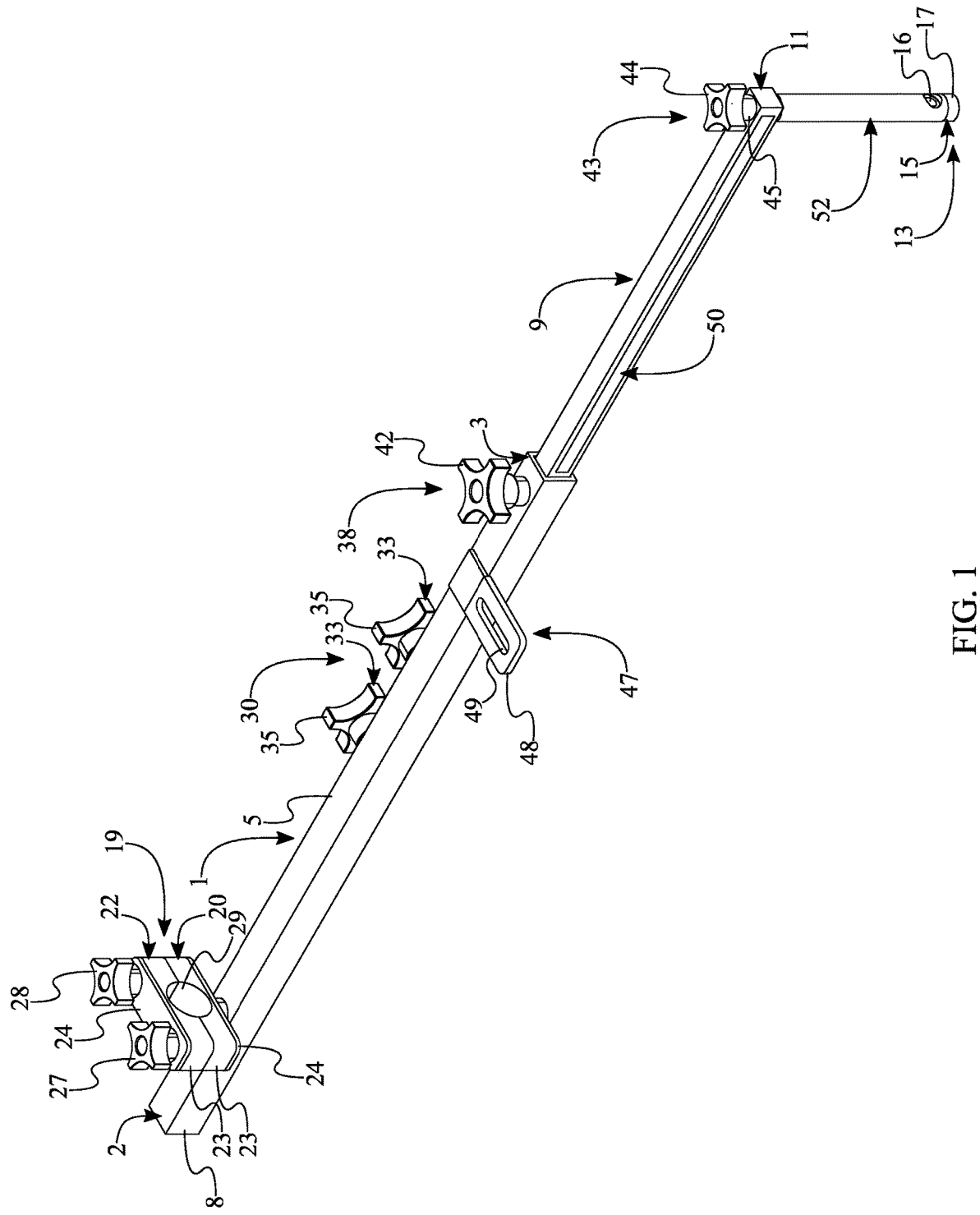
FIG. 1 is a perspective view of a preferred embodiment of the present invention.

All illustrations of the drawings are for the purpose of describing selected versions of the present invention and are not intended to limit the scope of the present invention.

The present invention is a mirror extension arm for a wide-load truck. The present invention allows a driver in a wide-load truck to have a larger range of vision while driving, specifically a wider peripheral vision range. The present invention also allows eliminates blind spots for a driver. Moreover, the present invention serves as a universal adapter for various types of wide-load trucks and side mirrors. In order to suspend a secondary side mirror alongside an existing side mirror of a wide-load truck, the present invention comprises an extension tube 1, a slide bar 9, a mounting spindle 13, at least one locking clamp 19, and a fastening mechanism 30, as seen in FIG. 1, FIG. 2, FIG. 3, FIG. 4, and FIG. 5. The extension tube 1 upholds the slide bar 9, and together, both the extension tube 1 and the slide bar 9 offset the mounting spindle 13. Moreover, the overall distance between the mounting spindle 13 and the corresponding side of the wide-load truck may be adjusted with the extension tube 1 and the slide bar 9. The extension tube 1 comprises a closed tube end 2 and an open tube end 3. The closed tube end 2 stops the slide bar 9 from extending towards the corresponding side of the wide-load truck. The open tube end 3 provides passage for the slide bar 9 into and out of the extension tube 1. More specifically, the slide bar 9 comprises a proximal bar end 10 and a distal bar end 11. The proximal bar end 10 is positioned within the extension tube 1, and the distal bar end 11 upholds the mounting spindle 13. The mounting spindle 13 serves as a connection for the secondary mirror with the present invention. Moreover, the mounting spindle 13 comprises a fixed spindle end 14, a free spindle end 15, and a mounting slot 16. The fixed spindle end 14 remains connected with the slide bar 9 while in use. The free spindle end 15 upholds the secondary side mirror along with additional fasteners through the mounting slot 16. The at least one locking clamp 19 fastens the present invention with a bracket of the existing side mirror. The fastening mechanism 30 locks and unlocks the position of the slide bar 9 within the extension tube 1.

The overall configuration of the aforementioned components allows the present invention to be safely mounted onto an existing side mirror of a variety of wide-load trucks. The slide bar 9 may traverse within and along the extension tube 1 as the closed the end is positioned opposite the open tube end 3 along the extension tube 1, as seen in FIG. 1. The slide bar 9 is telescopically engaged to the extension tube 1 through the open tube end 3, thereby providing variable length as needed or preferred by a driver. The mounting spindle 13 may be further extended from the extension tube 1 as the proximal bar end 10 is positioned opposite the distal bar end 11 along the slide bar 9. More specifically, the proximal bar end 10 is positioned within the extension tube 1. In order to maintain the structural integrity of the present invention while in use, the mounting spindle 13 is positioned perpendicular with the slide bar 9. The fixed spindle end 14 is positioned opposite the free spindle end 15 along the mounting spindle 13, defining an overall height of the mounting spindle 13. The mounting spindle 13 suspends a secondary side mirror as the fixed spindle end 14 is laterally mounted into the slide bar 9. The mounting slot 16 is positioned adjacent with the free spindle end 15, thereby positioning the secondary side mirror alongside the existing side mirror. Moreover, limiting the stress of the weight of the secondary side mirror on the slide bar 9. The mounting slot 16 is laterally traversing through the mounting spindle 13, providing passage through the mounting spindle 13 for a mount of the secondary side mirror. The mount for the secondary side mirror may also include a variety of fasteners for security. The at least one locking clamp 19 is laterally mounted with the extension tube 1, adjacent to the closed tube end 2, for a more secure connection between and along a bracket of the existing side mirror. In order to lengthen or shorten the distance between the secondary side mirror with the corresponding side of the wide-load truck, the slide bar 9 is operatively coupled with the extension tube 1 by the fastening mechanism 30, wherein the fastening mechanism 30 is used to lock the slide bar 9 along the extension tube 1 and is used to unlock the slide bar 9 from the extension tube 1.

While the wide-load truck is in operation or driving, the vibrations from the vehicle and from driving along the road translate through the extension tube 1 and the slide bar 9. In order to prevent a secondary side mirror from shaking or vibrating as a result, the present invention may further comprise a vibration-dampening press 38, as seen in FIG. 1, FIG. 2, FIG. 3, FIG. 4, FIG. 5, and FIG. 7. The vibration-dampening press 38 further locks the slide bar 9 within the extension tube 1 so that the slide bar 9 is not simply hanging from the connection with the fastening mechanism 30. The extension tube 1 readily receives the vibration-dampening press 38 as the extension tube 1 may further comprise a first hole 4. In order to push the slide bar 9 within the interior of the extension tube 1, the vibration-dampening press 38 may comprise a press shaft 39 and a press knob 42. The press shaft 39 extends into the extension tube 1 through the first hole 4 and presses against the slide bar 9 within the extension tube 1. The press shaft 39 may comprise a first shaft end 40 and a second shaft end 41. The first shaft end 40 connects with the press knob 42, and the second shaft end 41 directly presses against the slide bar 9. The press knob 42 provides a grip for a user to easily maneuver and twist the press shaft 39 into and out of the first hole 4. In order to maintain the structural integrity of the extension tube 1 while providing passage for the press shaft 39 into the extension tube 1, the first hole 4 laterally traverses into the extension tube 1, adjacent to the open tube end 3. More specifically, the first hole 4 is positioned opposite the mounting spindle 13 about the extension tube 1 to facilitate the tightening of the vibration-dampening press 38. The first shaft end 40 is positioned opposite the second shaft end 41 along the press shaft 39, defining an overall length for the press shaft 39. The press knob 42 is fixed onto the first shaft end 40 such that when the user maneuvers the press knob 42, the press shaft 39 moves simultaneously. In order for the user to access the press knob 42, the press knob 42 is externally positioned with the extension tube 1. In order for the press shaft 39 to remain connected with extension tube 1 and for the position of the press shaft 39 to be readily adjusted within the first hole 4, the press shaft 39 is threadably engaged through the first hole 4. The slide bar 9 does not shake or vibrate within the extension tube 1 as the second shaft end 41 is positioned against the slide bar 9.

Figure 5:
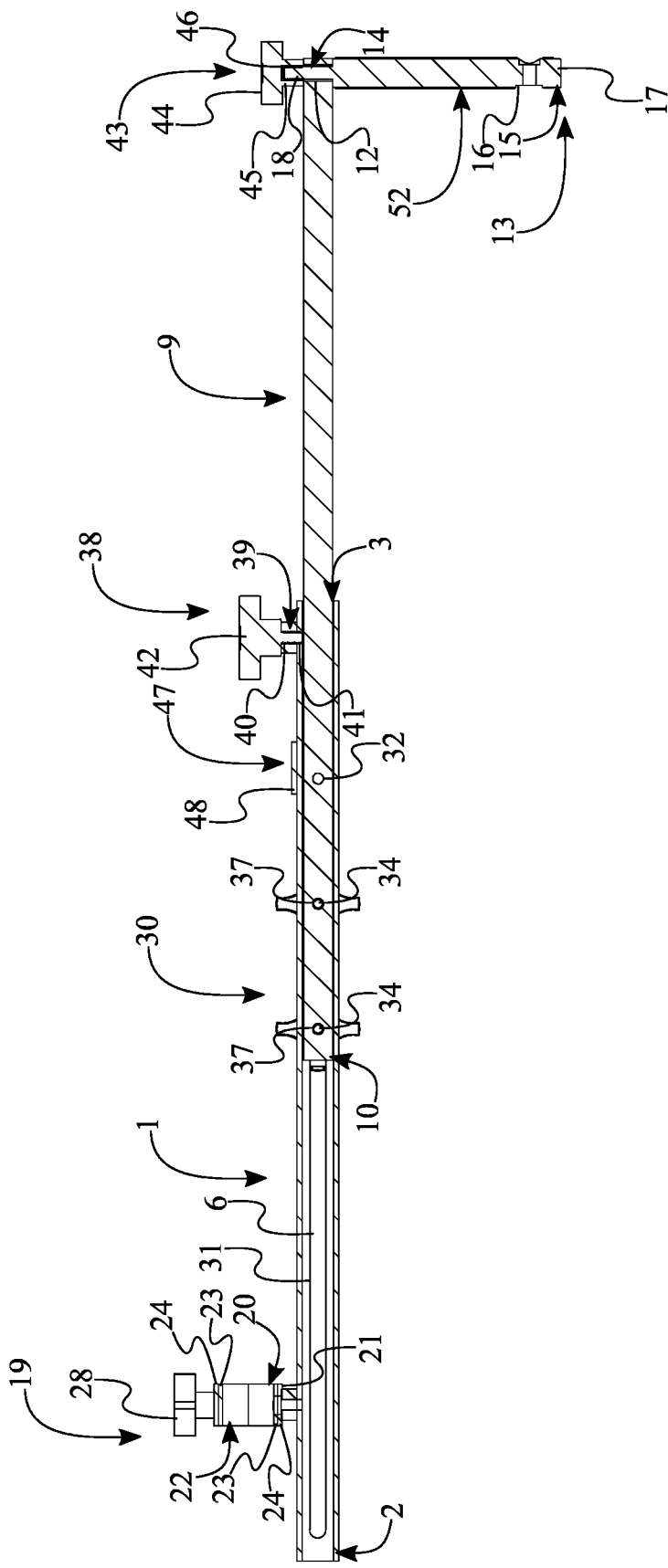
FIG. 5 is a cross-section view taken along line 5-5 in FIG. 3.

The present invention is modular and separable as the mounting spindle 13 is separable from the slide bar 9. In order for the mounting spindle 13 to be attached and detached with the slide bar 9, the present invention may further comprise a fastening knob 43, the slide bar 9 may further comprise a second hole 12, and the mounting spindle 13 may comprises an elongated body 17 and a fastening shaft 18, as seen in FIG. 5. The fastening knob 43 locks the mounting spindle 13 with the slide bar 9. The second hole 12 provides passage of the fastening shaft 18 through the slide bar 9 while maintaining the structural integrity of the slide bar 9. Moreover, the second hole 12 allows the fastening shaft 18 to be rotated, thereby allowing a secondary side mirror to be angled as needed. The elongated body 17 upholds a secondary side mirror, and the fastening shaft 18 engages with the slide bar 9. Moreover, the fastening knob 43 may comprise a grip body 44, a knob base 45, and a fastening slot 46. The grip body 44 provides a grip for a user to maneuver the knob base 45. The knob base 45 wraps around and locks onto the fastening shaft 18. The fastening slot 46 provides passage for the fastening shaft 18 into the grip body 44. The grip body 44 simultaneously turns with the knob base 45 as the grip body 44 is fixed onto the knob base 45. In order for the fastening shaft 18 to be positioned within and engaged with the knob base 45 while the structural integrity of the knob base 45 is preserved, the fastening slot 46 traverses into the knob base 45, opposite the grip body 44. In order for the fastening shaft 18 to be positioned through the slide bar 9, the second hole 12 laterally traverses through the slide bar 9, adjacent to the distal bar end 11. This arrangement also positions the mounting spindle 13 along the slide bar 9. The elongated hangs underneath the slide bar 9 as the fastening shaft 18 is terminally fixed with the elongated body 17. More specifically, the fixed spindle end 14 is positioned coincident with the fastening shaft 18, and the free spindle end 15 is positioned offset from the fastening shaft 18. In order to connect the mounting spindle 13 with the slide bar 9, the fastening shaft 18 is positioned through the second hole 12. In order to lock the fastening shaft 18 with the slide bar 9, the fastening knob 43 is positioned opposite the elongated body 17 about the slide bar 9, and the fastening shaft 18 is threadably engaged into the fastening slot 46.

Figure 2:
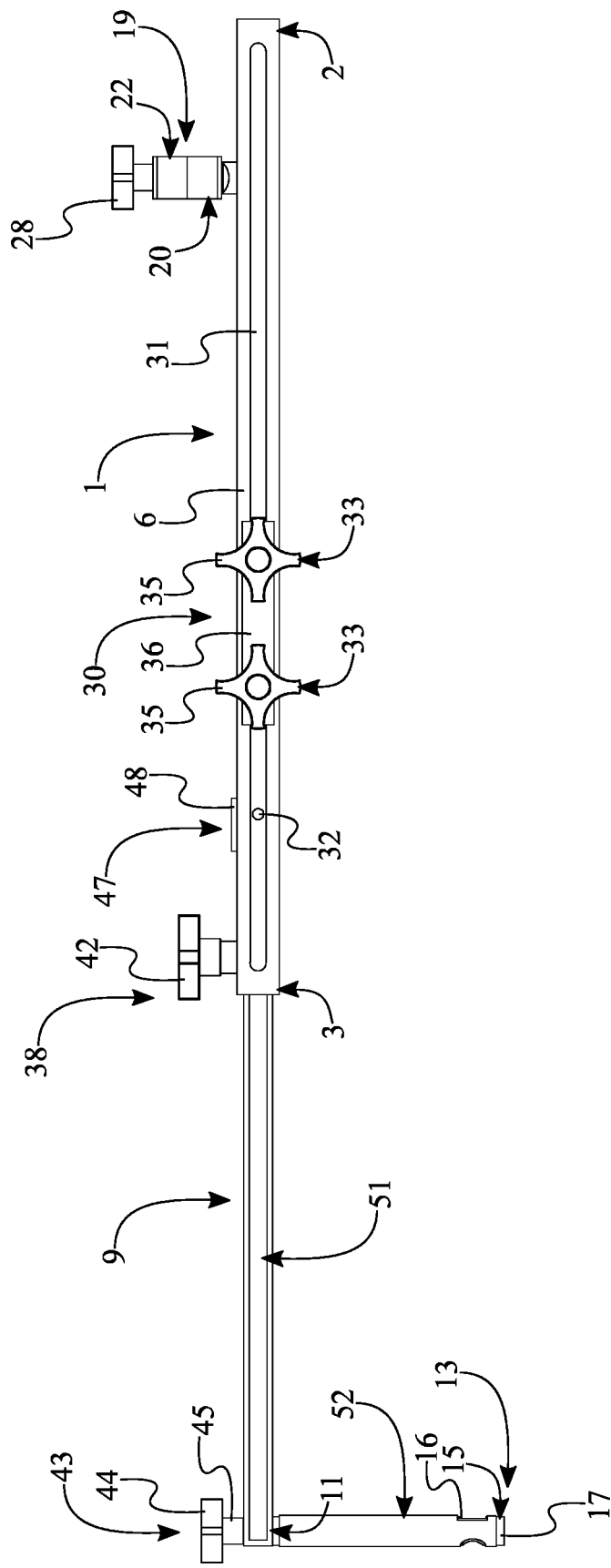
FIG. 2 is a rear side view of the preferred embodiment of the present invention.
Figure 4:
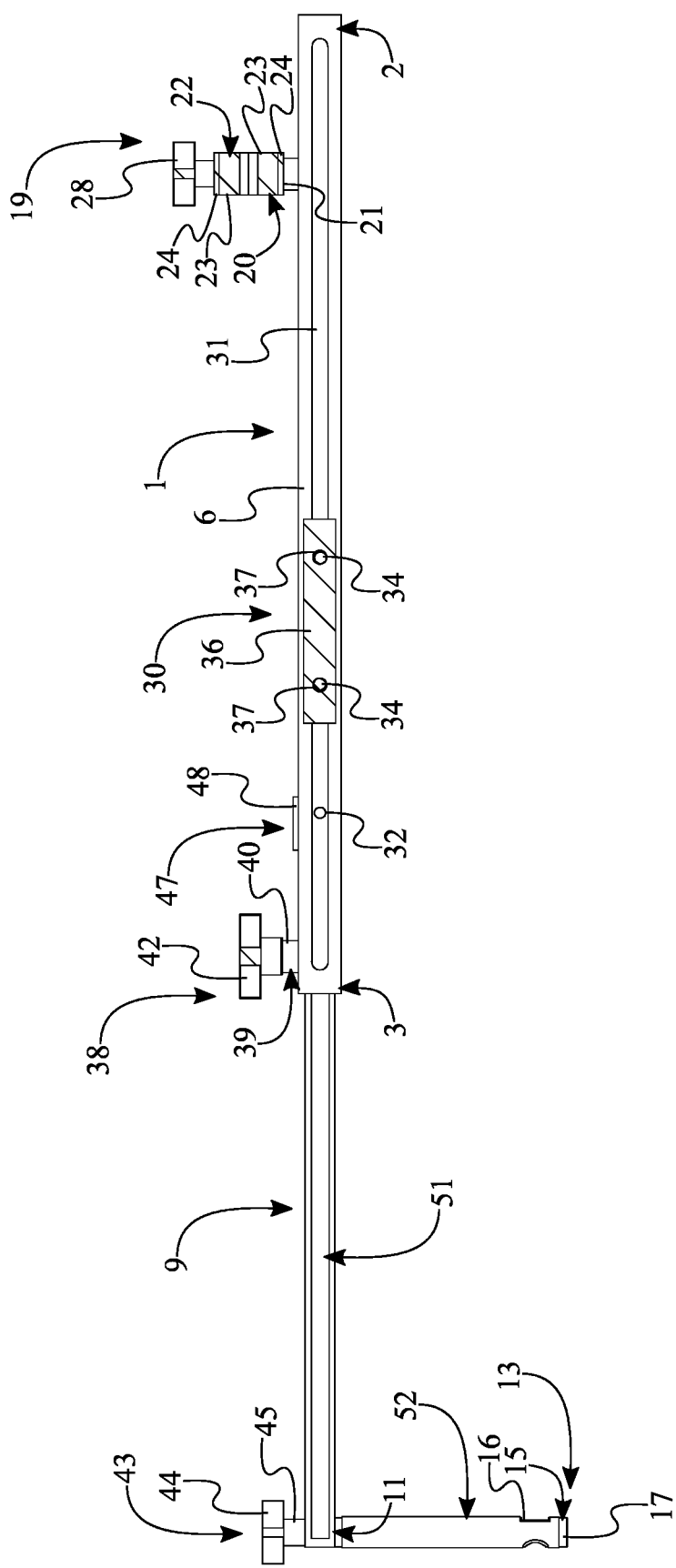
FIG. 4 is a cross-section view taken along line 4-4 in FIG. 3.

The position of the slide bar 9 along the elongated tube is secure and a desired overall length of the present invention is defined as the fastening mechanism 30 may comprise an elongated track 31, a plurality of third holes 32, at least one knobbed fastener 33, a slider plate 36, and at least one fourth hole 37, seen in FIG. 2, FIG. 4, and FIG. 5. The elongated track 31 allows the at least one knobbed fastener 33 to slide along the extension tube 1. The plurality of third holes 32 provides passage for the at least one knobbed fastener 33 through the slide bar 9. More specifically, the plurality of third holes 32 allow the position of the at least one knobbed fastener 33, and consequently the slider plate 36, to be adjusted along the slider bar. The slider plate 36 positions the at least one knobbed fastener 33 and serves as a clamp for the slide bar 9 with the extension tube 1. The at least one fourth hole 37 provides passage for the at least one knobbed fastener 33 through the slider plate 36. More specifically, the at least one knobbed fastener 33 may comprise a threaded shaft 34 and a fastener head 35. The threaded shaft 34 pulls and releases the slide bar 9 with the extension tube 1. The fastener head 35 provides a grip for a user to maneuver the threaded shaft 34 to tighten or loosen the slide bar 9 with the extension tube 1. As the slide bar 9 slides within and along the elongated track 31, the elongated track 31 laterally traverses into and along the extension tube 1. The plurality of third holes 32 is positioned adjacent with the proximal bar end 10 and is positioned offset from each other. Moreover, the plurality of third holes 32 laterally traverses through the slide bar 9, providing maximum length for the slide bar 9 outside of the extension tube 1 if needed. In order for the slide bar 9 within the extension and the slider plate 36 to clamp with the extension tube 1, the slider plate 36 is externally positioned with the extension tube 1. More specifically, the slider plate 36 is positioned adjacent with the elongated track 31. The slide tube and the slider plate 36 is tightened and loosened with the extension tube 1 as the at least one fourth hole 37 traverses through the slider plate 36. The threaded shaft 34 twists as the fastener head 35 is maneuvered as the fastener head 35 is terminally fixed with the threaded shaft 34. In order for extension tube 1 to be tightened between the slide bar 9 and the slider plate 36, the threaded shaft 34 is threadably engaged into a selected hole from the plurality of third holes 32 and the at least one fourth hole 37. More specifically, the fastener head 35 is positioned adjacent with the slider plate 36, opposite the extension tube 1.

Figure 3:
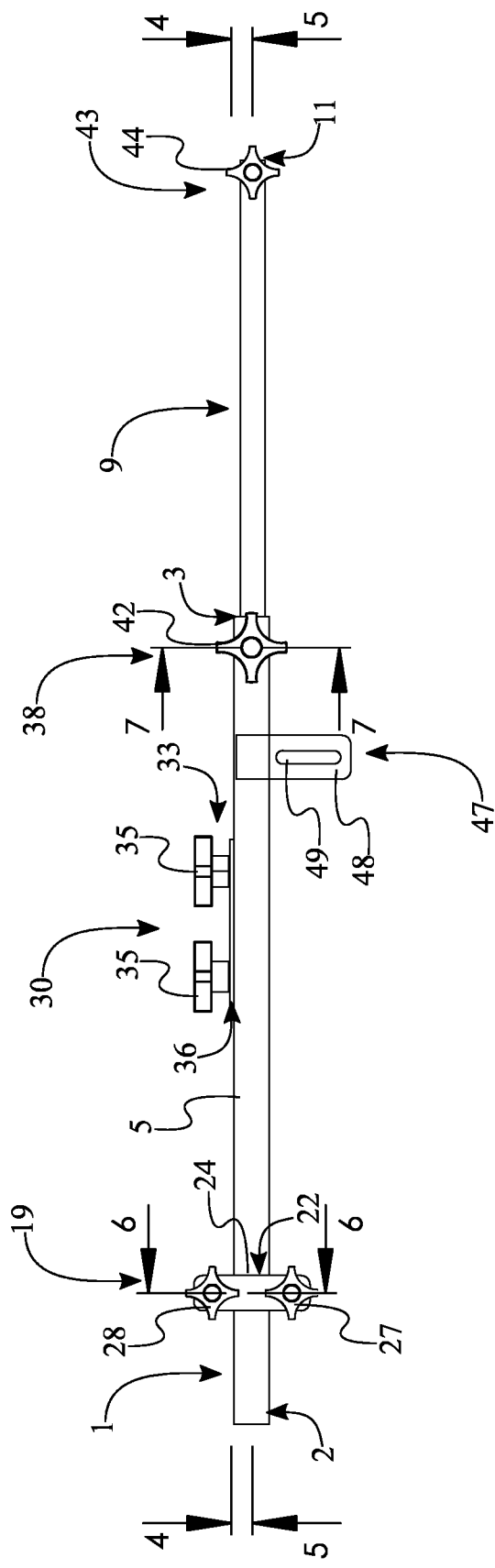
FIG. 3 is a top side view of a preferred embodiment of the present invention.

In order to further secure the connection of the extension tube 1 across an existing bracket of a side mirror, the present invention may further comprise at least one bracket 47, seen in FIG. 1 and FIG. 3. The at least one bracket 47 serves as another connection between the present invention and the existing bracket of the side mirror. More specifically, the at least one bracket 47 may comprise an elongated plate 48 and a bracket slot 49. The elongated plate 48 extends past the extension tube 1, either closer or across the bracket of the existing side mirror. The bracket slot 49 allows a fastener to secure the elongated plate 48 with the bracket of the existing side mirror. The extension tube 1 is terminally fixed with the elongated plate 48. In order to counterbalance the connection already established by the at least one locking clamp 19 with the bracket of the existing side mirror, the at least one bracket 47 is positioned offset with the open tube end 3. The bracket slot 49 traverses through and along the elongated plate 48, providing passage for a fastener through the elongated plate 48 while preserving the structural integrity of the elongated plate 48. More specifically, the bracket slot 49 is positioned perpendicular to the extension tube 1.

Figure 6:
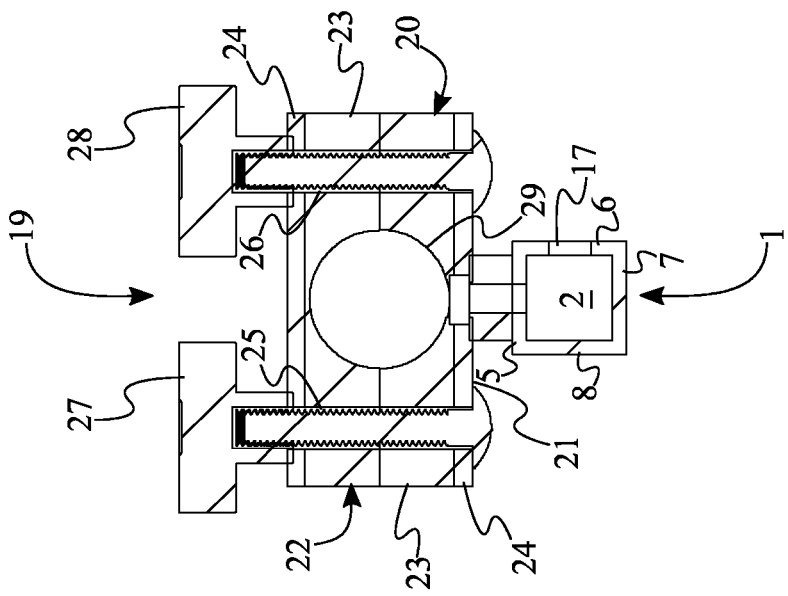
FIG. 6 is a cross-section view taken along line 6-6 in FIG. 3.
Figure 7:
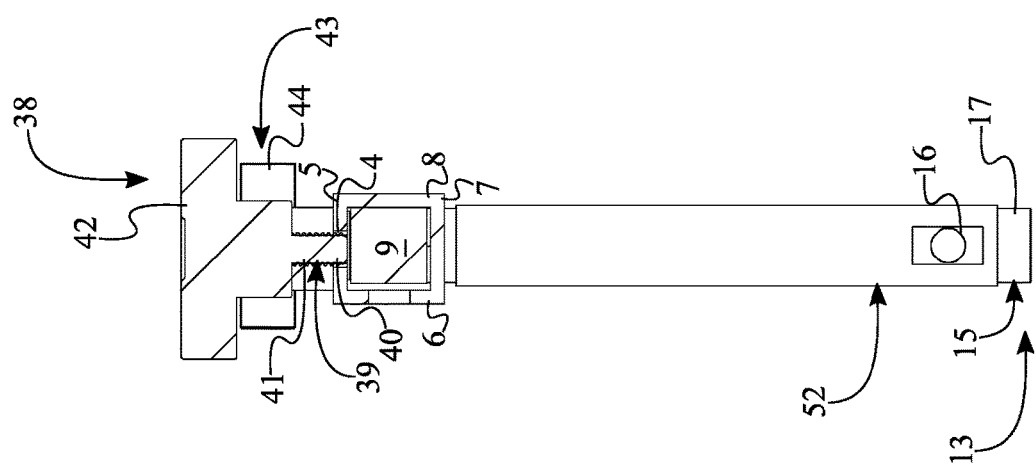
FIG. 7 is a cross-section view taken along line 7-7 in FIG. 3.

In the preferred embodiment of the present invention, the extension tube 1 further comprises a first lateral wall 5, a second lateral wall 6, a third lateral wall 7, and a fourth lateral wall 8, seen in FIG. 6 and FIG. 7. The first lateral wall 5, the second lateral wall 6, the third lateral wall 7, and the fourth lateral wall 8 define a square-shaped or a rectangular-shaped cross-section. Moreover, first lateral wall 5, the second lateral wall 6, the third lateral wall 7, and the fourth lateral wall 8 laterally surround the slide bar 9. In order for the slide bar 9 to be surrounded by the extension tube 1, the first lateral wall 5 is fixed adjacent with and along the second lateral wall 6. Furthermore, the third lateral wall 7 is fixed adjacent with and along the second lateral wall 6, opposite the first lateral wall 5. Furthermore, the fourth lateral wall 8 is fixed adjacent with and along the third lateral wall 7, opposite the second lateral wall 6. Furthermore, the first lateral wall 5 is fixed adjacent with and along the fourth lateral wall 8, opposite the third lateral wall 7. More specifically, the first lateral wall 5 and the third lateral wall 7 is positioned perpendicular with the second lateral wall 6 and the fourth lateral wall 8, thereby defining a square-shaped or a rectangular-shaped cross-section.

The present invention serves as a universal safety accessory for wide-load trucks as in the preferred embodiment of the present invention, the at least one locking clamp 19 is fixed with the first lateral wall 5, and the fastening mechanism 30 is integrated into and along the fourth lateral wall 8, seen in FIG. 1, FIG. 2, FIG. 3, FIG. 4, FIG. 5, and FIG. 6. In an alternate embodiment of the present invention, the at least one locking clamp 19 is fixed with the fourth lateral wall 8. Furthermore, the fastening mechanism 30 is integrated into and along the second lateral wall 6. In another alternate embodiment, the at least one locking clamp 19 is fixed with the third lateral wall 7. Furthermore, the fastening mechanism 30 is integrated into and along the fourth lateral wall 8.

In order for the at least one locking clamp 19 to be secure around a bracket of an existing side mirror, the at least one locking clamp 19 may comprise a fixed jaw 20, a free jaw 22, a first screw hole 25, a second screw hole 26, a first mounting screw 27, a second mounting screw 28, a post-receiving channel 29, seen in FIG. 1, FIG. 2, FIG. 4, FIG. 5, and FIG. 6. The fixed jaw 20 and the free jaw 22 wrap around the bracket. More specifically, the fixed jaw 20 remains connected with the extension tube 1, and the free jaw 22 is removably attached with the fixed jaw 20. The first screw hole 25 and the second screw hole 26 each provide a passage for the first mounting screw 27 and the second mounting screw 28 through both the fixed jaw 20 and the free jaw 22 while preserving the structural integrity of both the fixed jaw 20 and the free jaw 22. The first mounting screw 27 and the second mounting screw 28 lock and unlock the free jaw 22 with the fixed jaw 20. The post-receiving channel 29 receives a portion of the bracket of the existing side mirror. In order to connect the extension tube 1 with the existing side mirror, the extension tube 1 is positioned adjacent with an outer surface 21 of the fixed jaw 20, and the fixed jaw 20 is laterally mounted with the extension tube 1. A portion of the bracket of the existing side mirror may be positioned in between the fixed jaw 20 and the free jaw 22 as the free jaw 22 is positioned adjacent to the fixed jaw 20, opposite the extension tube 1. The first screw hole 25 and the second screw hole 26 traverse through the free jaw 22 and the fixed jaw 20 and are positioned offset from each other, thereby allowing the bracket to remain uninhibited while positioned between the fixed jaw 20 and the free jaw 22. The free jaw 22 is tightened with the fixed jaw 20 as the first mounting screw 27 is threadably engaged with the first screw hole 25, and the second mounting screw 28 is threadably engaged with the second screw hole 26. The post-receiving channel 29 is positioned in between the first screw hole 25 and the second screw hole 26. In order for the extension arm, and consequently the slide bar 9 to be positioned parallel across the existing side mirror, the post-receiving channel 29 is positioned perpendicular to the first screw hole 25 and the second screw hole 26, and laterally traverses through the free jaw 22 and the fixed jaw 20. In alternate embodiments of the present invention, the at least one locking clamp 19 further comprises a first cap and a second cap. The first cap and the second cap further fasten the first mounting screw 27 and the second mounting screw 28, respectively with the free jaw 22. In order to clamp the fixed jaw 20 with the free jaw 22, a head of the first mounting screw 27 and a head of the second mounting screw are positioned adjacent with the outer surface 21 of the fixed jaw 20. Moreover, the first cap and the second cap are positioned adjacent with the free jaw 22 opposite the fixed jaw 20. In order to further secure the first mounting screw 27 within the first screw hole 25, the first mounting screw 27 is threadably engaged into a screw-hole of the first cap. Similarly, the second mounting screw 28 is threadably engaged into a screw-hole of the second cap.

In the preferred embodiment of the present invention, the free jaw 22 and the fixed jaw 20 each comprise a friction-inducing pad 23 and a base plate 24, also seen in FIG. 1, FIG. 2, FIG. 4, FIG. 5, and FIG. 6. The friction-inducing pad 23 further secures the position of the at least one locking clamp 19 along the bracket of the existing side mirror. The base plate 24 provides the structural integrity for the free jaw 22 and the fixed jaw 20, respectively. The friction-inducing pad 23 is positioned and tightened around the bracket of the existing side mirror as the friction-inducing pad 23 is fixed across the base plate 24. More specifically, the friction-inducing pad 23 of the free jaw 22 and the friction-inducing pad 23 of the fixed jaw 20 is oriented towards each other. In order for the free jaw 22 and the fixed jaw 20 to be pressed towards each other, the base plate 24 of the free jaw 22 and the base plate 24 of the fixed jaw 20 is oriented away from each other. Moreover, the post-receiving channel 29 traverses through the friction-inducing pad 23 of the free jaw 22 and the friction-inducing pad 23 of the fixed jaw 20.

The safety of the present invention is enhanced as the present invention may further comprise a first reflector strip 50, a second reflector strip 51, and a reflector wrap 52, seen in FIG. 1, FIG. 2, FIG. 4, FIG. 5, and FIG. 7. The first reflector strip 50, the second reflector strip 51, and the reflector wrap 52, together, provide high visibility of the present invention while attached to a wide-load truck. The first reflector strip 50, the second reflector strip 51, and the reflector wrap 52 increase the safety of oncoming traffic and meet requirements of wide-load trucks over a specific width having markings to convey risk and serve as a warning. Moreover, the first reflector strip 50, the second reflector strip 51, and the reflector wrap 52 increase the safety for individuals around the corresponding wide-load truck as nearby drivers are visually alerted of the present invention, and consequently, the wide-load truck. The first reflector strip 50 is laterally fixed along the slide bar 9, thereby visually identifying the slide bar 9 preferably across the front of the wide-load truck. Likewise, the second reflector strip 51 is laterally fixed along the slide bar 9, opposite the first reflector strip 50, thereby visually identifying the slide bar 9 preferably across the rear of the wide-load truck. More specifically, the mounting spindle 13 is positioned in between the first reflector strip 50 and the second reflector strip 51. The reflector wrap 52 is laterally fixed around the mounting spindle 13, thereby visually identifying the mounting spindle 13 from all angles around the mounting spindle 13.

Although the invention has been explained in relation to its preferred embodiment, it is to be understood that many other possible modifications and variations can be made without departing from the spirit and scope of the invention as hereinafter claimed.

What is claimed is:

1. A mirror extension arm for a wide-load truck comprising:
   an extension tube;
   a slide bar;
   a mounting spindle;
   at least one locking clamp;
   a fastening mechanism;
   the extension tube comprising a closed tube end and an open tube end;
   the slide bar comprising a proximal bar end and a distal bar end;
   the mounting spindle comprising a fixed spindle end, a free spindle end, and a mounting slot;
   the closed tube end being positioned opposite the open tube end along the extension tube;
   the slide bar being telescopically engaged to the extension tube through the open tube end;
   the proximal bar end being positioned opposite the distal bar end along the slide bar;
   the proximal bar end being positioned within the extension tube;
   the mounting spindle being positioned perpendicular with the slide bar;
   the fixed spindle end being positioned opposite the free spindle end along the mounting spindle;
   the fixed spindle end being laterally mounted into the slide bar;
   the mounting slot being positioned adjacent with the free spindle end;
   the mounting slot laterally traversing through the mounting spindle;
   the at least one locking clamp being laterally mounted with the extension tube, adjacent to the closed tube end; and
   the slide bar being operatively coupled with the extension tube by the fastening mechanism, wherein the fastening mechanism is used to lock the slide bar along the extension tube and is used to unlock the slide bar from the extension tube.

2. The mirror extension arm for a wide-load truck as claimed in claim 1 comprising:
   a vibration-dampening press;
   the extension tube further comprising a first hole;
   the vibration-dampening press comprising a press shaft and a press knob;
   the press shaft comprising a first shaft end and a second shaft end;
   the first hole laterally traversing into the extension tube, adjacent to the open end;
   the first hole being positioned opposite the mounting spindle about the extension tube;
   the first shaft end being positioned opposite the second shaft end along the press shaft;
   the press knob being fixed onto the first shaft end;
   the press knob being externally positioned with the extension tube;
   the press shaft being threadably engaged through the first hole; and
   the second shaft end being positioned against the slide bar.

3. The mirror extension arm for a wide-load truck as claimed in claim 1 comprising:
   a fastening knob;
   the slide bar further comprising a second hole;
   the mounting spindle comprising an elongated body and a fastening shaft;
   the fastening knob comprising a grip body, a knob base, and a fastening slot;
   the grip body being fixed onto the knob base;
   the fastening slot traversing into the knob base, opposite the grip body;
   the second hole laterally traversing through the slide bar, adjacent to the distal bar end;
   the fastening shaft being terminally fixed with the elongated body;
   the fixed spindle end being positioned coincident with the fastening shaft;
   the free spindle end being positioned offset from the fastening shaft;
   the fastening shaft being positioned through the second hole;
   the fastening knob being positioned opposite the elongated body about the slide bar; and
   the fastening shaft being threadably engaged into the fastening slot.

4. The mirror extension arm for a wide-load truck as claimed in claim 1 comprising:
   the fastening mechanism comprising an elongated track, a plurality of third holes, at least one knobbed fastener, a slider plate, and at least one fourth hole;
   the at least one knobbed fastener comprising a threaded shaft and a fastener head;
   the elongated track laterally traversing into and along the extension tube;
   the plurality of third holes being positioned adjacent with the proximal bar end;
   the plurality of third holes being positioned offset from each other;
   the plurality of third holes laterally traversing through the slide bar;
   the slider plate being externally positioned with the extension tube;
   the slider plate being positioned adjacent with the elongated track;

the at least one fourth hole traversing through the slider plate;
the fastener head being terminally fixed with the threaded shaft;
the threaded shaft being threadably engaged into a selected hole from the plurality of third holes and the at least one fourth hole; and
the fastener head being positioned adjacent with the slider plate, opposite the extension tube.

5. The mirror extension arm for a wide-load truck as claimed in claim 1 comprising:
at least one bracket;
the at least one bracket comprising an elongated plate and a bracket slot;
the extension tube being terminally fixed with the elongated plate;
the at least one bracket being positioned offset with the open tube end;
the bracket slot traversing through and along the elongated plate; and
the bracket slot being positioned perpendicular to the extension tube.

6. The mirror extension arm for a wide-load truck as claimed in claim 1 comprising:
the extension tube further comprising a first lateral wall, a second lateral wall, a third lateral wall, and a fourth lateral wall;
the first lateral wall being fixed adjacent with and along the second lateral wall;
the third lateral wall being fixed adjacent with and along the second lateral wall, opposite the first lateral wall;
the fourth lateral wall being fixed adjacent with and along the third lateral wall, opposite the second lateral wall;
the first lateral wall being fixed adjacent with and along the fourth lateral wall, opposite the third lateral wall; and
the first lateral wall and the third lateral wall being positioned perpendicular with the second lateral wall and the fourth lateral wall.

7. The mirror extension arm for a wide-load truck as claimed in claim 6 comprising:
the at least one locking clamp being fixed with the first lateral wall; and
the fastening mechanism being integrated into and along the fourth lateral wall.

8. The mirror extension arm for a wide-load truck as claimed in claim 6 comprising:
the at least one locking clamp being fixed with the fourth lateral wall; and
the fastening mechanism being integrated into and along the second lateral wall.

9. The mirror extension arm for a wide-load truck as claimed in claim 6 comprising:
the at least one locking clamp being fixed with the third lateral wall; and
the fastening mechanism being integrated into and along the fourth lateral wall.

10. The mirror extension arm for a wide-load truck as claimed in claim 1 comprising:
the at least one locking clamp comprising a fixed jaw, a free jaw, a first screw hole, a second screw hole, a first mounting screw, a second mounting screw, a post-receiving channel;
the extension tube being positioned adjacent with an outer surface of the fixed jaw;
the fixed jaw being laterally mounted with the extension tube;
the free jaw being positioned adjacent to the fixed jaw, opposite the extension tube;
the first screw hole and the second screw hole traversing through the free jaw and the fixed jaw;
the first screw hole and the second screw hole being positioned offset from each other;
the first mounting screw being threadably engaged with the first screw hole;
the second mounting screw being threadably engaged with the second screw hole;
the post-receiving channel being positioned in between the first screw hole and the second screw hole;
the post-receiving channel being positioned perpendicular to the first screw hole and the second screw hole; and
the post-receiving channel laterally traversing through the free jaw and the fixed jaw.

11. The mirror extension arm for a wide-load truck as claimed in claim 10 comprising:
the free jaw and the fixed jaw each comprising a friction-inducing pad and a base plate;
the friction-inducing pad being fixed across the base plate;
the friction-inducing pad of the free jaw and the friction-inducing pad of the fixed jaw being oriented towards each other;
the base plate of the free jaw and the base plate of the fixed jaw being oriented away from each other; and
the post-receiving channel traversing through the friction-inducing pad of the free jaw and the friction-inducing pad of the fixed jaw.

12. The mirror extension arm for a wide-load truck as claimed in claim 1 comprising:
a first reflector strip;
a second reflector strip;
a reflector wrap;
the first reflector strip being laterally fixed along the slide bar;
the second reflector strip being laterally fixed along the slide bar, opposite the first reflector strip;
the mounting spindle being positioned in between the first reflector strip and the second reflector strip; and
the reflector wrap being laterally fixed around the mounting spindle.

13. A mirror extension arm for a wide-load truck comprising:
an extension tube;
a slide bar;
a mounting spindle;
at least one locking clamp;
a fastening mechanism;
a vibration-dampening press;
a first reflector strip;
a second reflector strip;
a reflector wrap;
at least one bracket;
the extension tube comprising a closed tube end, an open tube end, and a first hole;
the slide bar comprising a proximal bar end and a distal bar end;
the mounting spindle comprising a fixed spindle end, a free spindle end, and a mounting slot;
the vibration-dampening press comprising a press shaft and a press knob;
the press shaft comprising a first shaft end and a second shaft end;
the at least one bracket comprising an elongated plate and a bracket slot;

the closed tube end being positioned opposite the open tube end along the extension tube;

the slide bar being telescopically engaged to the extension tube through the open tube end;

the proximal bar end being positioned opposite the distal bar end along the slide bar;

the proximal bar end being positioned within the extension tube;

the mounting spindle being positioned perpendicular with the slide bar;

the fixed spindle end being positioned opposite the free spindle end along the mounting spindle;

the fixed spindle end being laterally mounted into the slide bar;

the mounting slot being positioned adjacent with the free spindle end;

the mounting slot laterally traversing through the mounting spindle;

the at least one locking clamp being laterally mounted with the extension tube, adjacent to the closed tube end;

the slide bar being operatively coupled with the extension tube by the fastening mechanism, wherein the fastening mechanism is used to lock the slide bar along the extension tube and is used to unlock the slide bar from the extension tube; the first hole laterally traversing into the extension tube, adjacent to the open end;

the first hole being positioned opposite the mounting spindle about the extension tube;

the first shaft end being positioned opposite the second shaft end along the press shaft;

the press knob being fixed onto the first shaft end;

the press knob being externally positioned with the extension tube;

the press shaft being threadably engaged through the first hole;

the second shaft end being positioned against the slide bar;

the first reflector strip being laterally fixed along the slide bar;

the second reflector strip being laterally fixed along the slide bar, opposite the first reflector strip;

the mounting spindle being positioned in between the first reflector strip and the second reflector strip;

the reflector wrap being laterally fixed around the mounting spindle;

the extension tube being terminally fixed with the elongated plate;

the at least one bracket being positioned offset with the open tube end;

the bracket slot traversing through and along the elongated plate; and the bracket slot being positioned perpendicular to the extension tube.

14. The mirror extension arm for a wide-load truck as claimed in claim 13 comprising:

a fastening knob;

the slide bar further comprising a second hole;

the mounting spindle comprising an elongated body and a fastening shaft;

the fastening knob comprising a grip body, a knob base, and a fastening slot;

the grip body being fixed onto the knob base;

the fastening slot traversing into the knob base, opposite the grip body;

the second hole laterally traversing through the slide bar, adjacent to the distal bar end;

the fastening shaft being terminally fixed with the elongated body;

the fixed spindle end being positioned coincident with the fastening shaft;

the free spindle end being positioned offset from the fastening shaft;

the fastening shaft being positioned through the second hole;

the fastening knob being positioned opposite the elongated body about the slide bar; and the fastening shaft being threadably engaged into the fastening slot.

15. The mirror extension arm for a wide-load truck as claimed in claim 13 comprising:

the fastening mechanism comprising an elongated track, a plurality of third holes, at least one knobbed fastener, a slider plate, and at least one fourth hole;

the at least one knobbed fastener comprising a threaded shaft and a fastener head;

the elongated track laterally traversing into and along the extension tube;

the plurality of third holes being positioned adjacent with the proximal bar end;

the plurality of third holes being positioned offset from each other;

the plurality of third holes laterally traversing through the slide bar;

the slider plate being externally positioned with the extension tube;

the slider plate being positioned adjacent with the elongated track;

the at least one fourth hole traversing through the slider plate;

the fastener head being terminally fixed with the threaded shaft;

the threaded shaft being threadably engaged into a selected hole from the plurality of third holes and the at least one fourth hole; and the fastener head being positioned adjacent with the slider plate, opposite the extension tube.

16. The mirror extension arm for a wide-load truck as claimed in claim 13 comprising:

the extension tube further comprising a first lateral wall, a second lateral wall, a third lateral wall, and a fourth lateral wall;

the first lateral wall being fixed adjacent with and along the second lateral wall;

the third lateral wall being fixed adjacent with and along the second lateral wall, opposite the first lateral wall;

the fourth lateral wall being fixed adjacent with and along the third lateral wall, opposite the second lateral wall;

the first lateral wall being fixed adjacent with and along the fourth lateral wall, opposite the third lateral wall; and the first lateral wall and the third lateral wall being positioned perpendicular with the second lateral wall and the fourth lateral wall.

17. The mirror extension arm for a wide-load truck as claimed in claim 16 comprising:

the at least one locking clamp being fixed with the first lateral wall; and the fastening mechanism being integrated into and along the fourth lateral wall.

18. The mirror extension arm for a wide-load truck as claimed in claim 16 comprising:

the at least one locking clamp being fixed with the fourth lateral wall; and the fastening mechanism being integrated into and along the second lateral wall.

19. The mirror extension arm for a wide-load truck as claimed in claim 16 comprising:
the at least one locking clamp being fixed with the third lateral wall; and
the fastening mechanism being integrated into and along the fourth lateral wall.

20. The mirror extension arm for a wide-load truck as claimed in claim 13 comprising:
the at least one locking clamp comprising a fixed jaw, a free jaw, a first screw hole, a second screw hole, a first mounting screw, a second mounting screw, a post-receiving channel;
the free jaw and the fixed jaw each comprising a friction-inducing pad and a base plate;
the extension tube being positioned adjacent with an outer surface of the fixed jaw;
the fixed jaw being laterally mounted with the extension tube;
the free jaw being positioned adjacent to the fixed jaw, opposite the extension tube;
the first screw hole and the second screw hole traversing through the free jaw and the fixed jaw;
the first screw hole and the second screw hole being positioned offset from each other;
the first mounting screw being threadably engaged with the first screw hole;
the second mounting screw being threadably engaged with the second screw hole;
the post-receiving channel being positioned in between the first screw hole and the second screw hole;
the post-receiving channel being positioned perpendicular to the first screw hole and the second screw hole;
the post-receiving channel laterally traversing through the free jaw and the fixed jaw;
the friction-inducing pad being fixed across the base plate;
the friction-inducing pad of the free jaw and the friction-inducing pad of the fixed jaw being oriented towards each other;
the base plate of the free jaw and the base plate of the fixed jaw being oriented away from each other; and
the post-receiving channel traversing through the friction-inducing pad of the free jaw and the friction-inducing pad of the fixed jaw.

* * * * *